(12) United States Patent
Andersson et al.

(10) Patent No.: US 6,467,349 B1
(45) Date of Patent: Oct. 22, 2002

(54) ARRANGEMENT FOR MEASURING ANGULAR VELOCITY

(75) Inventors: Gert Andersson, Lindome; Nils Hedenstierna, Västra Frolund; Per Svensson, Billdal, all of (SE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/600,919

(22) PCT Filed: Jan. 22, 1999

(86) PCT No.: PCT/SE99/00096
§ 371 (c)(1),
(2), (4) Date: Sep. 12, 2000

(87) PCT Pub. No.: WO99/38016
PCT Pub. Date: Jul. 29, 1999

(30) Foreign Application Priority Data

Jan. 23, 1998 (SE) ............................................. 9800194

(51) Int. Cl.⁷ ............................................. G01C 19/00
(52) U.S. Cl. .................................................. 73/504.14
(58) Field of Search ........................ 73/504.12, 504.13, 73/504.14, 504.15, 504.16, 514.21, 514.23

(56) References Cited

U.S. PATENT DOCUMENTS

| 4,538,461 A | 9/1985 | Juptner et al. |
| 4,598,585 A | 7/1986 | Boxenhorn |
| 5,329,815 A | 7/1994 | Dunn et al. |

FOREIGN PATENT DOCUMENTS

| GB | 2 198 231 | 6/1988 |
| WO | 94/12886 | 6/1994 |
| WO | 96/27135 | 9/1996 |

Primary Examiner—Richard A. Moller
(74) Attorney, Agent, or Firm—Venable; Robert Kinberg

(57) ABSTRACT

In a sensor for measuring angular velocity a body is formed from a planer substrate The body defines a beam, the opposed ends of which are adapted to be fixed in position, the beam having a preferential bending direction which makes an acute angle with the plane of the planar substrate. The beam carries an inertia mass comprising two arms interconnected by a connecting bar, the central part of the connecting bar being formed integrally with part of the beam. Capacitative plates located adjacent a conductive layer on the arms are provided with potentials which cause the inertia mass to rotate about the axis of the connecting bar with a "see-saw" action which, because of the configuration of the beam leads to a rotational oscillation of the inertia mass in the plane of the substrate. If the arrangement is rotated about an axis coincident with the connecting bar, the inertia mass rotates about an axis coincident with the beam with an oscillating rotation. This is detected by capacitative plates to determine angular velocity.

33 Claims, 8 Drawing Sheets

Figure 1:
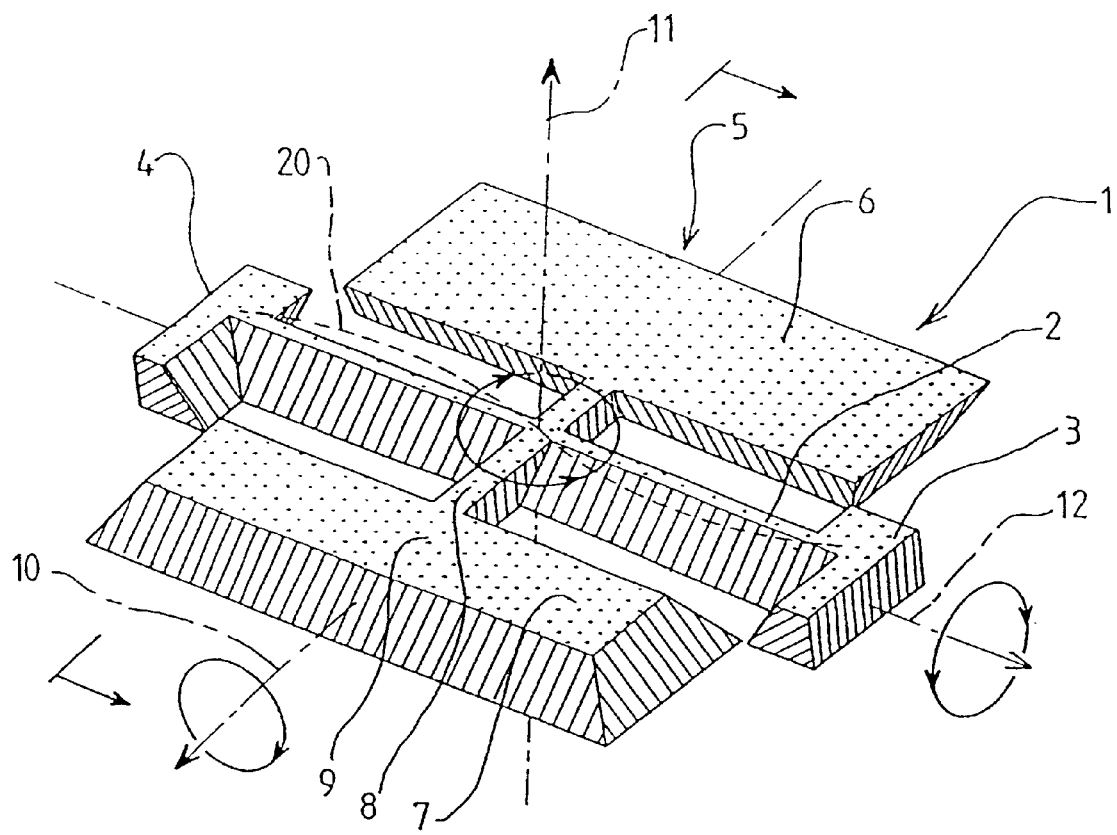
Figure 1:
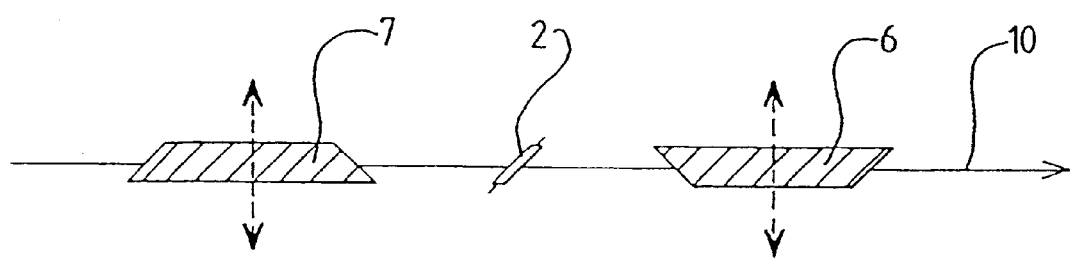

Moment of inertia:

$$\begin{cases} I_y = \int_A x^2 \, dA \\ I_{xy} = \int_A xy \, dA \\ I_x = \int_A y^2 \, dA \end{cases} \quad \boxed{\text{Transform}} \Rightarrow \quad \begin{cases} I_{y'} = \int_A x'^2 \, dA = I_{max} \\ I_{xy'} = \int_A x'y' \, dA = 0 \\ I_{x'} = \int_A y'^2 \, dA = I_{min} \end{cases}$$

ARRANGEMENT FOR MEASURING ANGULAR VELOCITY

THIS INVENTION

Relates to an arrangement for measuring angular velocity. An arrangement in accordance with the invention may be used in a motor vehicle to detect a roll-over accident to control the deployment of a safety device such as an air-bag.

Vibrating angular velocity meters/gyros of the tuning fork type, or which use other vibrating members, have heretofore been constructed and tested both in metal and quartz and also in silicon. Both types may be constructed with an open loop and with a closed feed-back loop. The advantage of quartz and silicon based gyros over the prior proposed metal-fork gyro (Barnaby et. al., Aeronautical engineering review, p. 31, November 1953) is that they can be miniaturised and manufactured relatively cheaply in large production runs by batch manufacture.

Unlike rotating gyros in which the Coriolis force develops a constant torque during a turn, turning of a vibrating gyro results in an oscillating torque in which the amplitude is proportional to the turning speed and the phase indicates the turning direction. As a result, relatively extensive electronic circuitry is required for excitation and detection and interpretation of the gyro signal from a vibrating gyro as compared with a conventional rotating gyro.

Since silicon is a well-developed electronic material, there is considerable advantage in using a silicon-based gyro integrated together with associated excitation and sensor electronics. However, it has not been possible to produce and excite a traditional tuning fork in silicon easily.

The advantage of a tuning fork construction is that it can be made to swing in a dynamically balanced mode which makes the gyro insensitive to vibration and which gives a high Q-factor since little vibration energy is yielded to the surroundings. Even if it is possible, in principle, using modern plasma etching techniques, to etch out, in silicon, a tuning fork (or any other horizontally swinging structure (Satchell, UK patent application, GB2198231A)), there still remains the excitation problem.

In silicon it is not possible to utilise the piezo-electric effect directly for excitation as in the case of quartz, since silicon is not a piezo-electric material. Of course a piezo-electric layer can be deposited on silicon, but if the structure has been etched out vertically down from the substrate surface, this means that a piezo-resistive layer of constant thickness has to be deposited on vertical walls, and this can be fairly problematic.

Instead, the hitherto most common solution to the excitation problem for silicon-based gyros has been to use electrostatic excitation at right angles to the substrate surface by making conductive plates on one or both sides of a bar or a swashplate (possibly with a weight thereon), or alternatively quite simply to "glue" practically the entire component on a piezo-electric plate.

Unfortunately, the micromechanical gyros previously proposed using electrostatic excitation at right angles to the substrate surface, which may be relatively easily produced, have suffered from a low gyroscopic scale factor of the order of magnitude of 0.01–0.2 (Boxhorn, U.S. Pat. No. 4,598,585). This can be compared with a tuning fork, which has a gyroscopic scale factor of 2 but which is much more difficult to produce, since it requires excitation parallel to the substrate surface, because the limbs must swing in the plane of the substrate in anti-phase with each other.

According to one aspect of this invention there is provided a sensor adapted to respond to a rotation, said sensor comprising a body formed from a substantially planar substrate, said body incorporating a beam, the beam having two opposed ends, each end being adapted to be fixed in position, the beam being provided with at least one inertia mass connected to the beam at a predetermined position, the body being associated with means for exciting a first oscillation of the inertia mass substantially about an axis perpendicular to the plane of the substrate, there being means for detecting a second oscillation of the mass, substantially around an axis coincident with the longitudinal axis of the beam, which second oscillation is caused by the coriolis force that arises when the body is subjected to rotation around an axis having at least a component in the said plane, but perpendicular to the said axis of the beam, the beam being configured so that the beam bends most easily in one predetermined direction, that direction making an acute angle with the plane, so that the direction is neither parallel with, nor perpendicular to the plane, so that the first oscillation may be initiated by an excitation force which is not parallel with said plane.

Preferably a sensor according to claim 1 wherein the beam is such that the first oscillation may be caused by an excitation force which is substantially perpendicular with said plane.

Conveniently the predetermined direction in which the beam bends most easily is at approximately 55° to the plane of the substrate.

Advantageously the or each inertia mass comprises two elements, located respectively on either side of the beam, within the plane of the substrate, the two elements being interconnected by a connecting bar, the central portion of the connecting bar being unitary with a portion of the beam.

Preferably the means for exciting the first oscillation of the or each inertia mass comprise at least one capacitative plate located adjacent a selected portion of the first inertia mass, and means to apply selected potentials to the capacitative plate, the inertia mass being provided with a conductive portion, there being means to apply a predetermined potential to the conductive portion, the arrangement being such that the potentials applied to the capacitative plate causes part of said inertia mass to tend to be deflected out of the plane of the substrate.

Conveniently there is a plurality of said capacitative plates.

Advantageously the or each capacitative plate is on a substrate of glass or semi-insulating silicon.

Preferably the means for applying potentials to said capacitative plate or plates are adapted to supply signals which generate a "see-saw" motion of the inertia mass about the connecting bar, the effect of the configuration of the beam being such that this oscillation generates the said first oscillation about the axis perpendicular to the plane of the substrate.

Conveniently the means for detecting the second oscillation comprise at least one further capacitative plate located adjacent on selected portions of the first inertia mass, and means to measure the capacitance between said further capacitative plate and the said body to detect said second oscillation.

Advantageously there is a plurality of said further capacitative plates.

In one embodiment there is only a single inertia mass, that inertia mass being located substantially centrally of the beam, half-way between the means provided at the opposed ends of the beam for mounting the beam in position.

Preferably the inertia mass is symmetrical about the axis of the beam.

In an alternative embodiment there are two inertia masses, the inertia masses being symmetrically disposed on the beam, each inertia mass being located at a position between the center part of the beam and a respective end of the beam.

Conveniently the two inertia masses are identical and symmetrical about the axis of the beam.

Preferably each inertia mass is provided with means for exciting a first oscillation of the mass around an axis perpendicular to the plane of the substrate, the arrangement being such that the masses oscillate in anti-phase.

Advantageously the body is formed from a mono-crystalline substrate, such as silicon.

The sensor may be adapted to provide an output signal representative of angular velocity.

The invention also relates to a sensor as described above mounted on a motor vehicle to control deployment of a safety device.

According to another aspect of this invention there is provided a sensor adapted to respond to a rotation, said sensor comprising a body formed from a substantially planar substrate, said body incorporating a beam, the beam having two opposed ends, each end being adapted to be fixed in position, the beam being provided with inertia mass means connected to the beam, the body being associated with means for exciting a first oscillation of the inertia mass means, that first oscillation being an oscillation substantially within the plane of the substrate, there being means for detecting a second oscillation of the inertia mass means, substantially around an axis coincident with the longitudinal axis of the beam, which second oscillation is caused by the coriolis force which arises when the body is subjected to a rotation about an axis, having at least a component in the said plane, but perpendicular to the said axis of the beam, wherein the inertia mass means comprises at least two discrete inertia masses, located at different longitudinal positions on the beam, the said two masses being excited to oscillate in anti-phase. Conveniently the predetermined axis is within the plane of the substrate and the perpendicular axis is coincident with the longitudinal axis of the beam. Preferably there are two inertia masses, the two inertia masses are symmetrically disposed on the beam, each inertia mass being located at a position between the center part of the beam and a respective end of the beam.

Conveniently the two inertia masses are identical and symmetrical about the axis of the beam.

Advantageously each inertia mass comprises two elements, located respectively on either side of the beam, within the plane of the substrate, the two elements being interconnected by a connecting bar, the central portion of the connecting bar being unitary with a portion of the beam.

Preferably the first oscillation may be caused by an excitation force which is substantially perpendicular with said plane.

In a preferred embodiment the means for exciting the first oscillation of the inertia masses comprises a plurality of capacitative plates, at least one capacitative plate being located adjacent a selected portion of each inertia mass, and means to apply selected potentials to the capacitative plates, the inertia masses each being provided with a conductive portion, there being means to apply a predetermined potential to the conductive portion provided on each inertia mass, the arrangement being such that the potentials applied to the capacitative plates cause part of each inertia mass to tend to be deflected out of the plane of the substrate. Advantageously each capacitative plate is on a substrate of glass or semi-insulating silicon.

Preferably the means for applying potentials to said capacitative plates are adapted to supply signals which generate a "see-saw" motion of each inertia mass about the connecting bar, the beam being configured so that the beam bends most easily in one predetermined direction, that direction making an acute angle with the plane of the substrate, so that the direction is neither parallel with, nor perpendicular to the plane, so that this "see-saw" oscillation generates the said first oscillation of each inertia mass about an axis perpendicular to the plane of the substrate.

Conveniently the means for detecting the second oscillation comprise further capacitative plates, at least one further capacitative plate being located adjacent a selected portion of each inertia mass, there being means to measure a capacitance between each of said further capacitative plates, and the said body to detect said second oscillation.

Preferably the body is formed from a mono-crystalline substrate, such as silicon The sensor may be adapted to provide an output signal representative of angular velocity.

The invention also relates to a sensor in accordance with the second aspect of the invention mounted on a motor vehicle to control deployment of a safety device.

The preferred embodiment of the present invention provides a vibrating gyro construction formed from a substrate which is adapted to be excited electrostatically unilaterally, with a gyroscopic scale factor greater than 0.2, and which is in the form of a dynamically balanced structure which is insensitive both to linear acceleration and to angular acceleration. This is achieved by suspending the gyroscopic mass or masses on a bar which is configured so that it bends most easily in one predetermined direction—herein termed the "soft" bending direction—which is not at right angles to or parallel to the substrate normal plane. As a result, the gyroscopic mass or masses can be made to move mainly in the plane of the substrate when an electrostatic excitation mainly at right angles to the substrate is applied with the correct frequency. In this way, the mass movement can be utilised so that a large gyroscopic torque is obtained out of the plane when the arrangement is subjected to a rotation in the plane at right angles to mass movement. Previous cardanically suspended constructions, such as that known from Swedish patent SE9500729-0 have the considerable disadvantage of a low gyroscopic scale factor, which makes the gyro vibration-sensitive, especially if it does not swing in a completely balanced mode—something which was hitherto impossible with unilateral excitation and detection.

The preferred embodiment of the present invention extends the technology of vibrating gyro constructions formed from a semi-conductor substrate to allow integration with a three-axis accelerometer if the same production technique known from Swedish patent SE9203648-2 is utilised to embody a bar whose "soft" bending direction is not at right angles to or parallel to the substrate normal plane, and permits the production of vibrating gyros in the same substrate for the simultaneous measurement of rotation around two axes at right angles to one another. Depending upon the application requirements, the preferred embodiments of the invention can be integrated in a number of configurations in the same substrate which may also incorporate accelerometers. This permits simultaneous measurement of rotation around a plurality of axes, possibly in combination with acceleration measurement. Also, depending upon the accuracy requirements of the application, the arrangement can be embodied either with an open or closed feed-back loop. The use of well-developed silicon technology in the production process permits mass production at low cost with high accuracy and reliability.

One preferred embodiment of the arrangement according to the invention for measuring angular velocity comprises a bar whose soft bending direction is not at right angles to or parallel to the normal to the substrate with a centrally disposed inertia mass which can be etched out from the same material as the bar. One example of such a material is silicon, which can be doped to produce conductive elements where required.

Another preferred embodiment of the arrangement according to the invention for measuring angular velocity comprises a bar whose soft bending direction is not at right angles to or parallel to the normal to the substrate and two inertia masses disposed along the bar which can be etched out from the same material as the bar. An example of such a material is silicon, which can be doped to produce conductive elements where required.

In both of these arrangements the inertia masses are connected to the rest of the substrate by a flexible bar which has a bending direction which is not at right angles to or parallel to the normal to the substrate. This can be achieved in various ways, for example, by anisotropic etching from opposite surfaces of a semi-conductor substrate to create a bar angled to the normal plane in accordance with SE9203648-2, and by making this connect the inertia masses to the substrate. Alternatively, anisotropic etching which etches at an oblique angle to the normal plane, may be combined with dry etching, which etches at a right angle to the normal plane, to produce a bar of triangular cross-section. Alternatively, it is possible to etch away one corner of a bar of rectangular cross-section with the result that the preferred bending direction is changed so that the preferred bending direction is no longer at right angles to the long sides of the rectangular cross-section. The bar width and thickness can, for all the above examples, be dimensioned so that high bending resilience is achieved along the required axis.

Both configurations discussed above are suitable for an embodiment of the type with an open loop and for an embodiment of the type with a closed feed-back loop. Hybrid embodiments are also feasible, in which a system with a closed feed-back loop is produced with a long time constant so that the gyro reacts to abrupt changes while slow drifts are cancelled out by feedback. The greatest advantages of a hybrid construction are that the mechanical amplification (Q-factor) in the direction of detection, obtained at the resonant frequency, can be utilised and that all the static sources of error are automatically cancelled out while the long-term drift problem is eliminated. In a conventional system with a closed loop, the Q-factor remains at 1 as a result of the high feedback. The hybrid construction nevertheless has the disadvantage that it is possible to measure only changes in rotational velocity, and not constant rotational velocities, since the constant signal, in time, is cancelled out by the weak feedback. The sensor has a high-pass characteristic whose cut-off frequency is determined by the feedback time-constant.

An open-loop construction is also possible, but again requires some type of balancing of the structure either mechanically or more attractively by means of DC voltage. Since the electrostatic force has a non-linear dependency on the distance between the electrodes, as in the case of a plate capacitor, it is possible to introduce negative spring constants electrically by means of DC. This makes it possible to compensate for mechanical imbalance and electrical imbalance in the structure by applying different DC voltages for excitation, and to detection plates, and possibly also to extra balancing electrodes, in accordance with a predetermined appropriate pattern.

An arrangement in accordance with the invention may be produced in semi-conductor material by well-known semi-conductor production methods comprising, for example, photolithographic patterning, isotropic and anisotropic etching. This provides many advantages including close tolerance control, and the possibility of integrating all or some of the signal processing electronics in a single common substrate of relatively moderate thickness, while providing access to a technology which permits effective mass-production by batch manufacture. Patterned conductive surfaces can be placed on the surface of the bar and the inertia masses, for example by "Anodic Bonding" or "Silicon Direct Bonding". "Anodic Bonding" allows quartz glass to be bonded to silicon, oxides, nitrides and metals at relative low temperatures (usually 300–400° C.), by applying an electric field over the joint. "Silicon Direct Bonding", which has been known since 1986 (Lasky, Applied Physics Letters Vol. 48, p. 78, 1986,) allows bonding, for example, of silicon to silicon, silicon to silicon dioxide and silicon dioxide to silicon dioxide. "Silicon Direct Bonding" and "Anodic Bonding" can also be utilised to attach mechanical stops to the bar so that it is not broken if it is subjected to greater forces than intended. If the bonding is carried out in vacuo, the techniques can be used simultaneously with a method of vacuum encapsulation of the arrangement.

Figure 2:
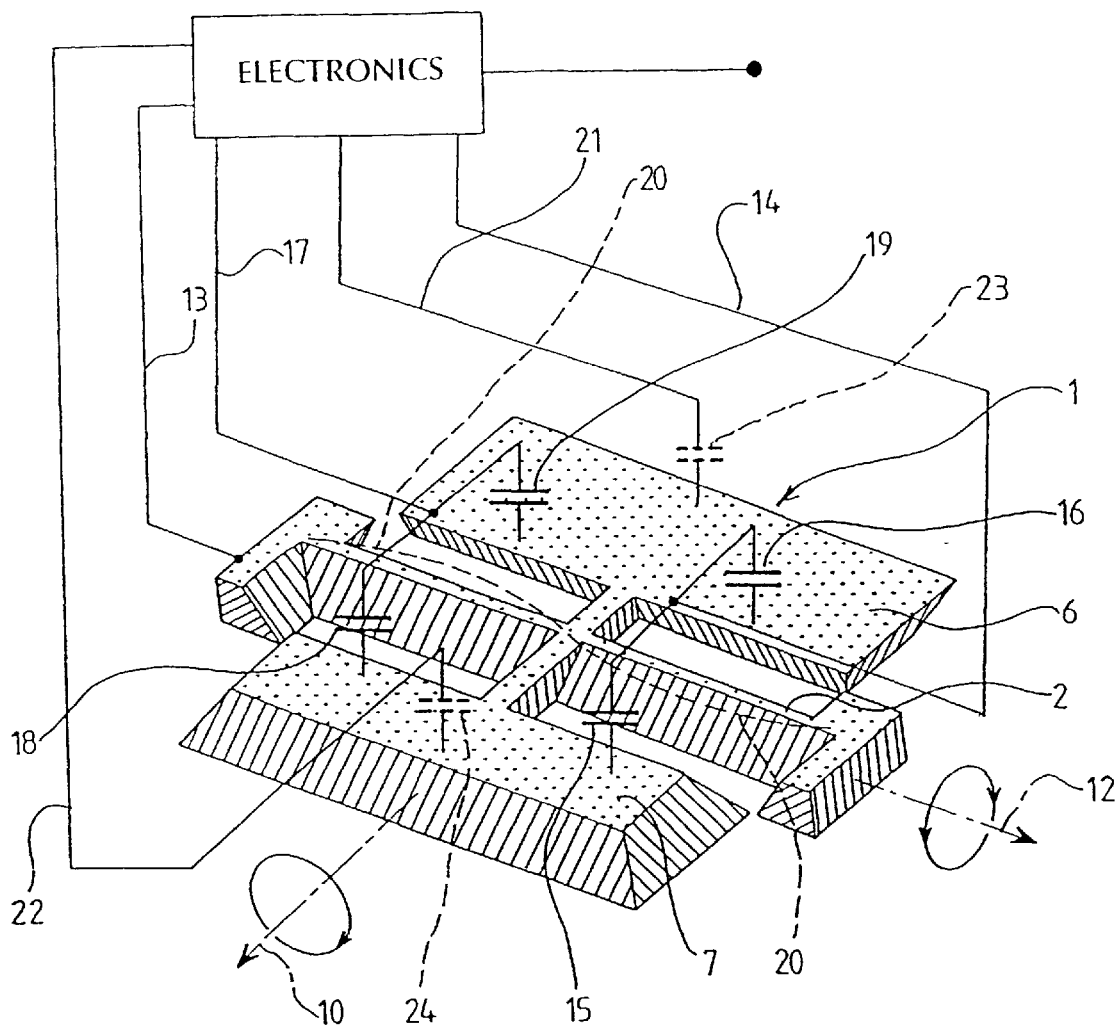
Figure 3:
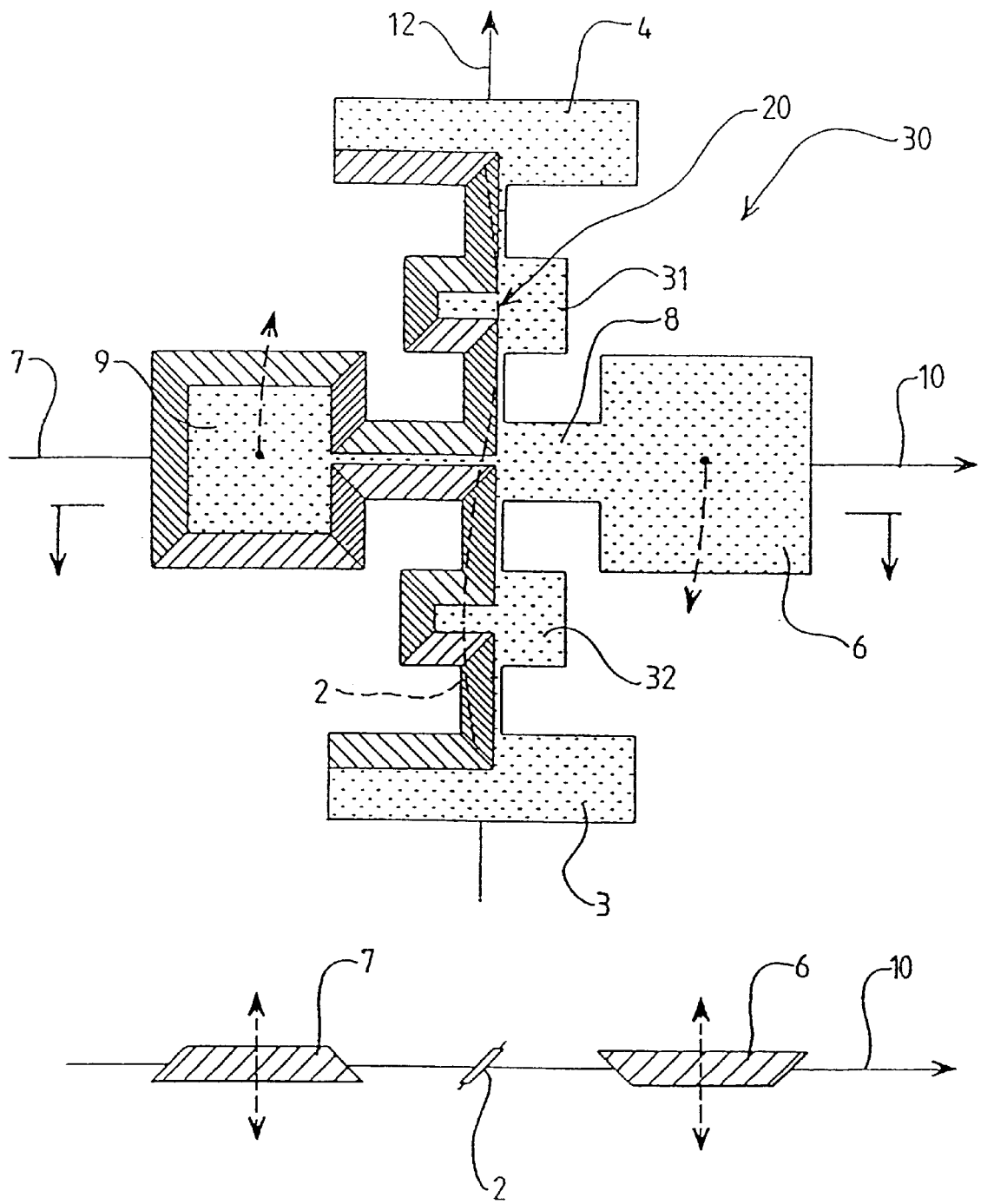
Figure 4:
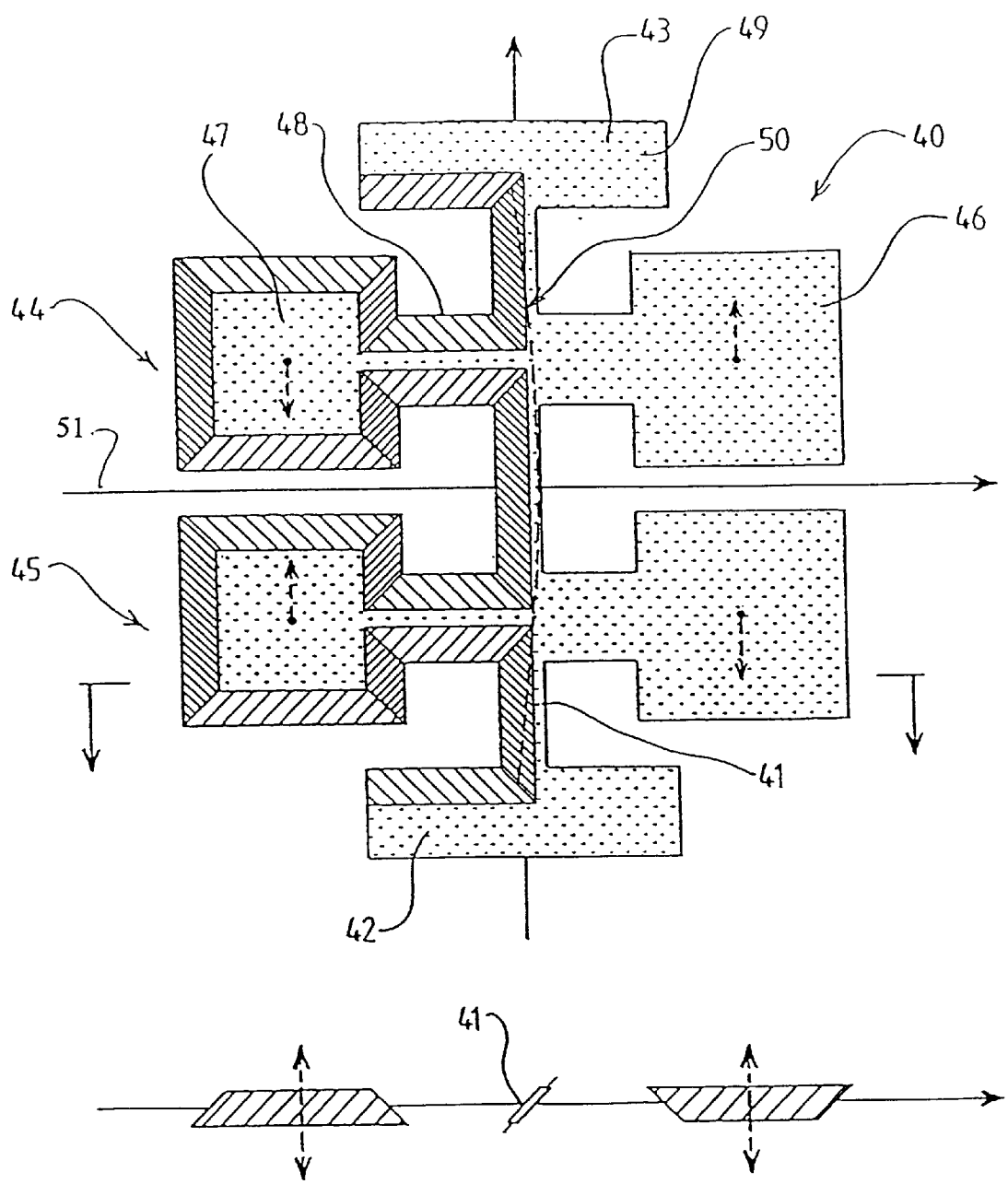

The invention will now be described in greater detail by way of example with reference to the accompanying drawings which illustrate embodiments of the arrangement according to the invention, in which:

FIG. 1 is a perspective view and a sectional view (taken along the line shown) showing a gyro body formed from silicon of a first configuration, according to the invention showing the excitation, detection and sensitivity axes, FIG. 2 is a diagrammatic perspective view of the body of FIG. 1 with associated excitation and detection circuits, FIG. 3 is a plan view and a sectional view (taken along the line shown) of an alternative of the first configuration body formed from silicon according to the invention, showing the excitation, detection and sensitivity axes, FIG. 4 is a plan view and a sectional view (taken along the line shown) of silicon of a second configuration according to the invention.

Figure 5:
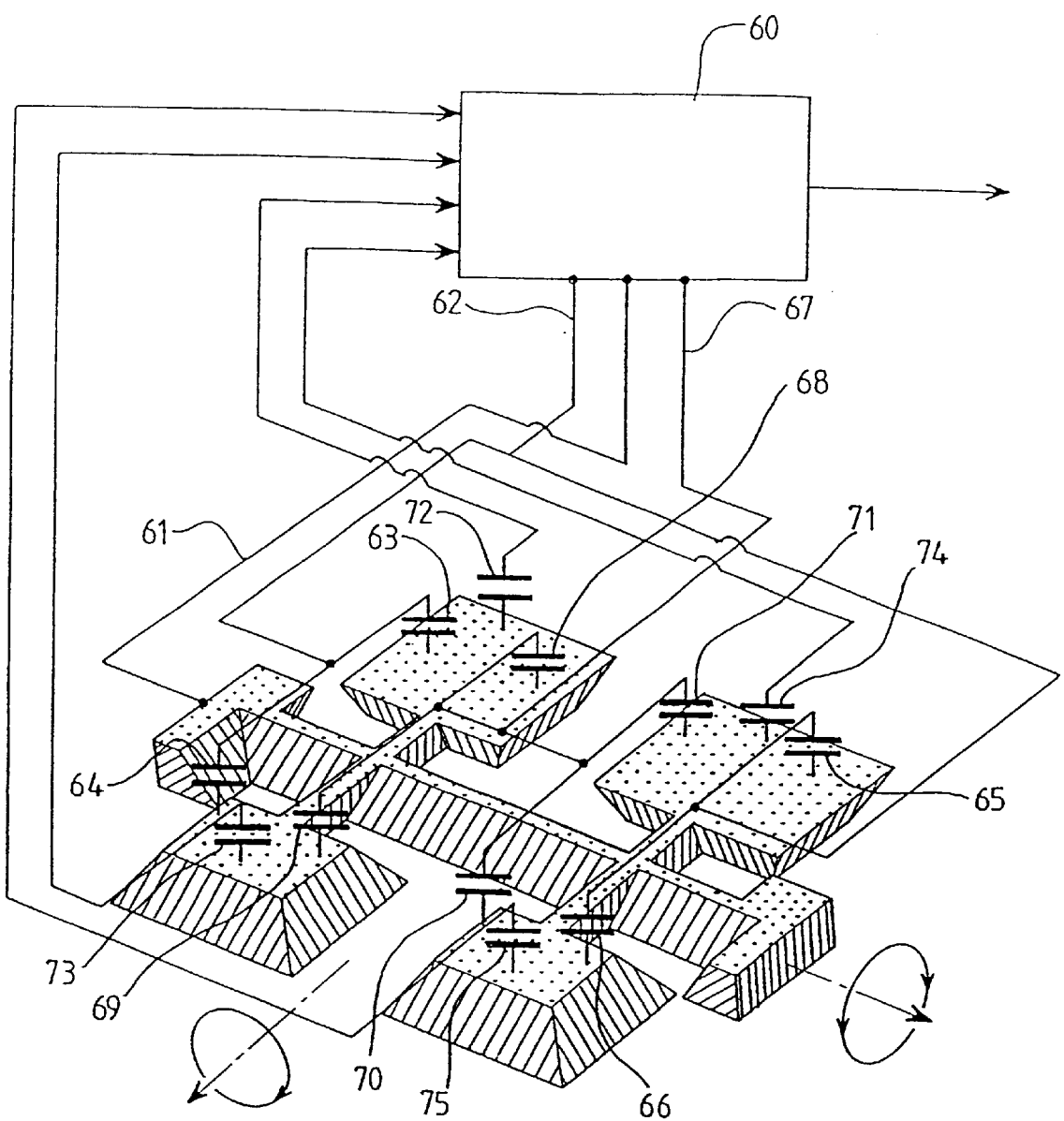
Figure 6:
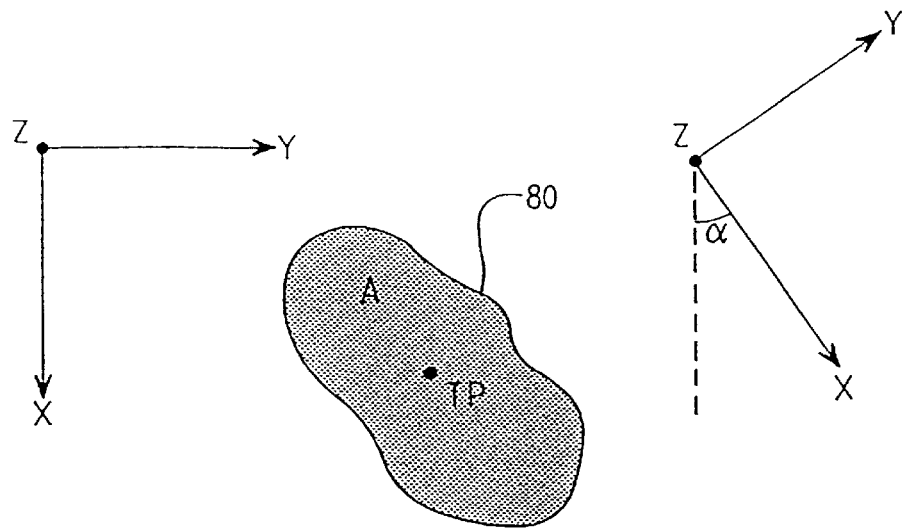
Figure 7:
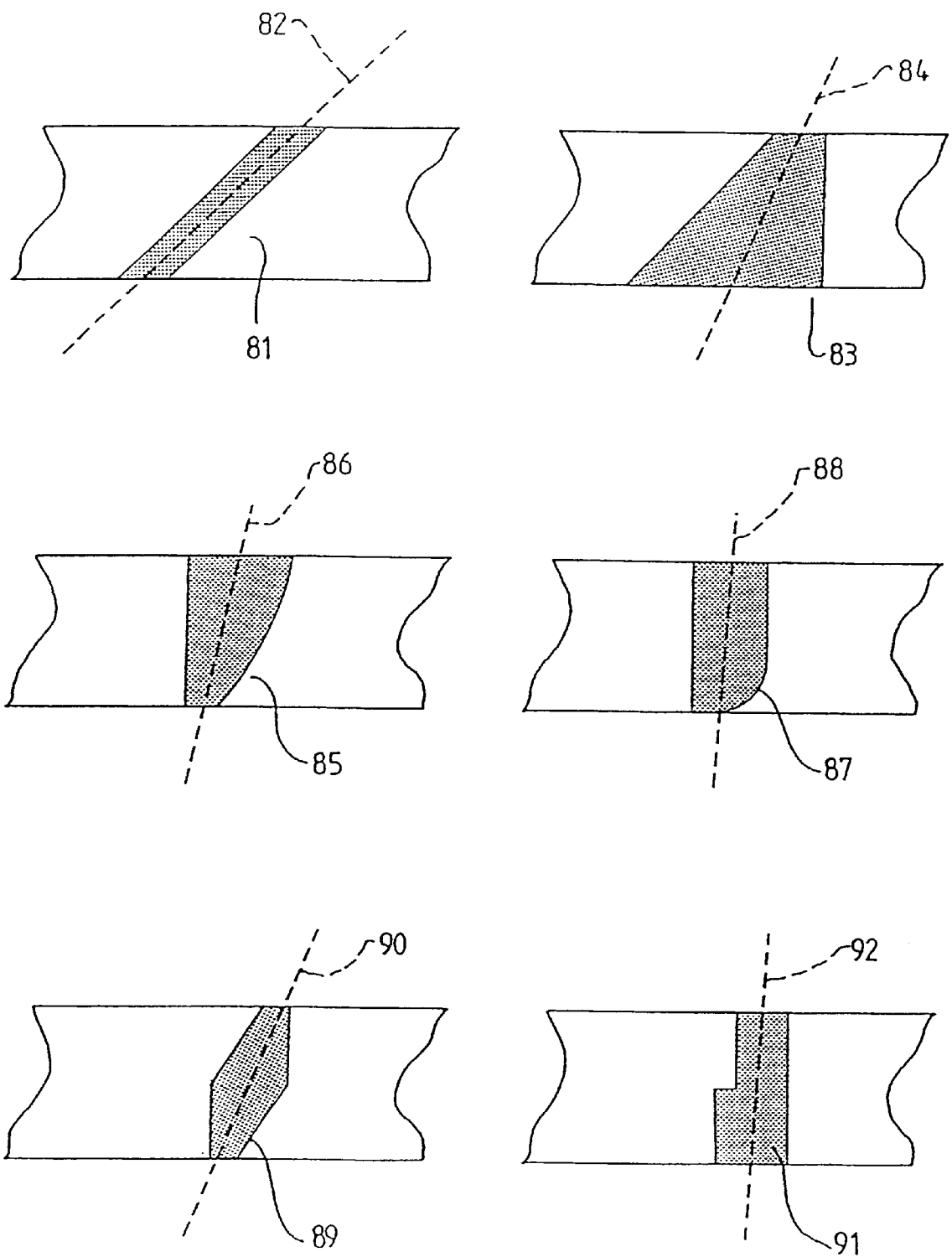
Figure 8:
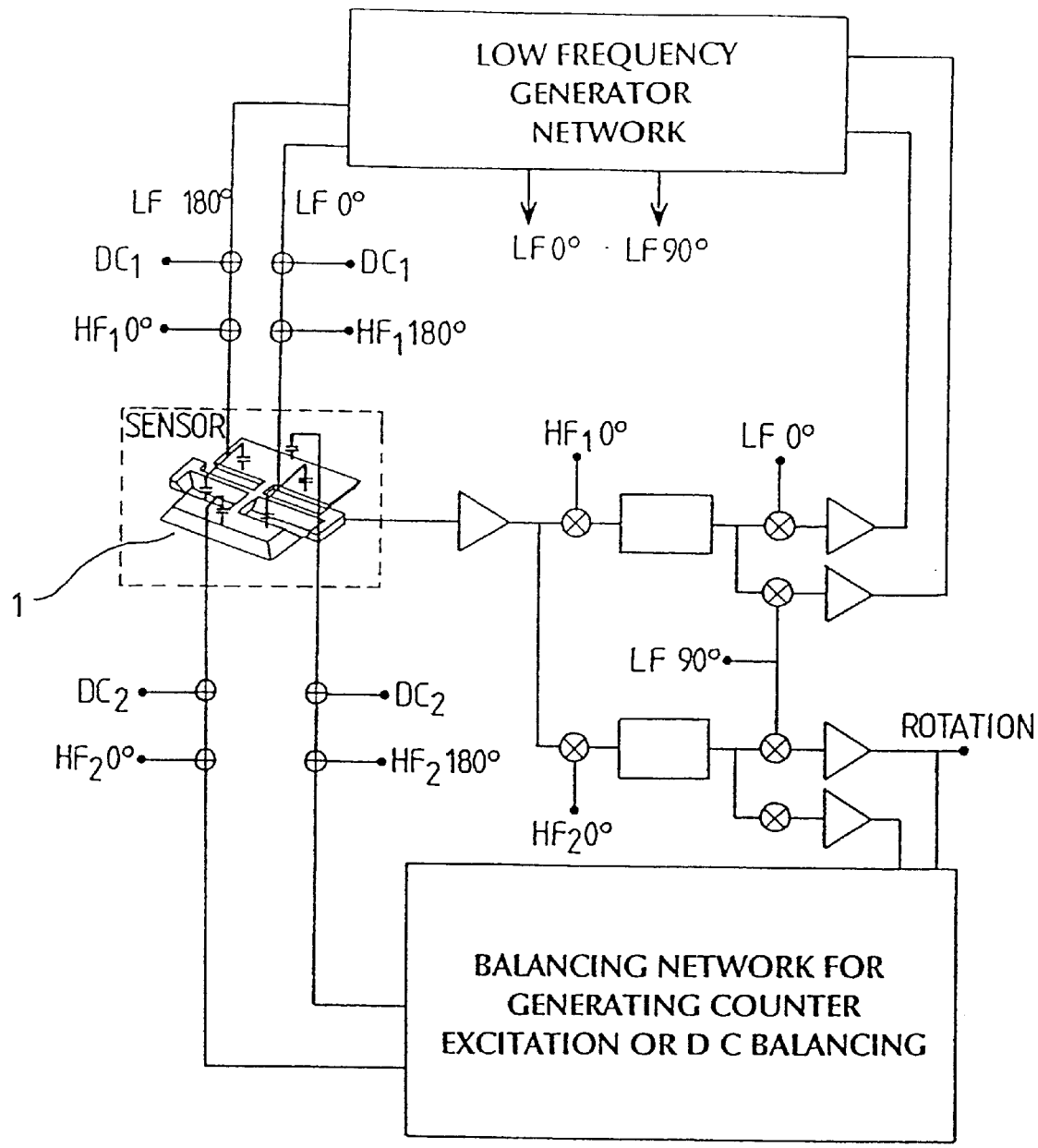

FIG. 5 is a perspective view of the body of FIG. 4 with associated excitation and detecting circuits, FIG. 6 is a sectional view used to explain the definition of the concept of the bar soft plane and bending direction, FIG. 7 shows examples of different bar cross-sections whose soft bending direction is not at right angles to or parallel to the normal plane, and FIG. 8 diagrammatically illustrates one example of a capacitative detection and excitation electronic circuit for use with the gyro body of FIGS. 1 and 2.

Referring initially to FIGS. 1 and 2, a sensor body 1 is illustrated which is adapted to sense rotation about a predetermined axis. The illustrated sensor body 1 has been etched from a planar substrate formed of a mono-crystalline material, such as silicon. It is to be appreciated that a plurality of bodies may be etched in a single substrate of a more crystalline body such as silicon, and may thus comprise a plurality of sensors adapted to sense rotation about a plurality of axes. The use of a semi-conductive and urban material such as silicon is preferred as the substrate may be doped to incorporate components of an associated electronic arrangement.

The body 1, as shown in FIG. 1, comprises an elongate beam 2, the opposed ends of which are supported by pads 3, 4, so that the opposed ends of the beam may be mounted in fixed predetermined positions. The pads 3, 4 are illustrated as being relatively small pads, but it is to be appreciated that the pads may form an integral part of a much larger silicon substrate.

The beam 2 is configured so that it bends most easily in one predetermined direction—the "soft" bending direction. In the described embodiment the "soft" bending direction is not parallel with the substrate, and is not perpendicular to the substrate, but instead is inclined at an acute angle to the plane of the substrate. In the described embodiment of the invention this is achieved by forming the beam 2 to have a generally rectangular cross-section, with the shorter sides of the rectangle being constituted by the upper and lower surfaces of the substrate, and the longer parallel sides of the rectangle being inclined at an acute angle to the surfaces of the substrate. In the described embodiment, the acute angle is approximately 55°. The "soft" bending direction of the beam is substantially perpendicular to the longer parallel sides of the rectangular cross-section.

The beam 2 is provided with an inertia mass, or an oscillating mass, 5. The oscillating mass 5 is connected to the beam 2 substantially at is centre-point. In the illustrated embodiment of the invention, the oscillating mass comprises a symmetrical body comprising two spaced apart parallel rectangular arms 6, 7 formed from the substrate which are inter-connected by a transverse connecting bar 8, the transverse connecting bar 8 having its mid point formed integrally with the mid point of the beam 2. the combination of the parallel arms and the connecting bar presents an "H"-shaped configuration.

The upper and/or lower surface of the body 1, and thus the surface of each of the arms 6, 7, is provided with an electrically conductive layer 9, such as a deposited layer of aluminium or other metal. Alternative, the conductive layer may be formed using a doping or a bonding technique.

The body 1, as shows in FIG. 1, is intended to be mounted securely in position, for example on the chassis of a motor vehicle, by means of the pads 3,4, to detect rotation about a sensitivity axis 10, the sensitivity axis being substantially coincident with the axis of the connecting bar 8 of the oscillating mass 5.

As will be described, the arms 6 and 7 are excited by electrostatic forces applied in a direction parallel to an excitation axis 10 which extends substantially perpendicularly to the plane defined by the substrate. As a consequence of the applied forces, the arms 6,7 tend to rotate about the axis of the connecting bar 8. Thus the "H"-shaped oscillating mass 5 tends to rock about the axis of the bar 8 with a "see-saw" motion. This applies a torsional rotation to the centre part of the beam 2. Because the beam 2 has a "soft" bending direction which makes an acute angle with the plane of the substrate, the torsional rotation leads directly to an oscillating movement of the oscillating mass 5 substantially within the plane of the substrate about the excitation axis 11. The mass 5 is symmetrical about the axis of the beam. The centre of gravity of the mass 5 stays substantially stationary as the mass oscillates.

As will also be explained, when the arms 6 and 7 are moving, within the plane of the substrate subsequent to the oscillation mass 5 being excited, and the body 1 is rotated about the sensitivity axis 10, the oscillating mass 5 will then oscillate about the detection axis 12, which is substantially coincident with the axis of the beam 2. The oscillation about the detection axis 12 is measured to provide data concerning the rotation of the body 1. Thus, the angular velocity of the rotation may be determined.

Referring now to FIG. 2 of the drawings, a body 1, as described above, is used in combination with an electronic arrangement. The electronic arrangement is associated with a first lead 13 adapted to supply a potential to the conductive layer 9 on the substrate. A second lead 14 supplies a signal to capacitative plates 15, 16, which lie above one end of the arms 6 and 7 located to one side of the interconnecting bar 8. A further lead 17 associated with the electronic arrangement is connected to capacitative plates 18, 19, located above the ends of the arms 6 and 7, located on the other side of the interconnecting bar 8. The described capacitative plates may be formed on an insulator, such as glass or semi-insulating silicon to minimise any stray capacitance.

It is to be appreciated that if a potential, such as a negative potential, is applied to the conductive layer 9, and subsequently a positive potential is applied, by the electronic arrangement, to the lead 14 and thus to the plates 15, 16 lying adjacent one end of the arms 6 and 7, those ends of the arms 6 and 7 will tend to move upwardly towards the plates 15 and 16 due to electrostatic attraction. Consequently, the oscillation mass 5 will tend to rotate about the connecting bar 8. This effect may be enhanced if simultaneously a negative potential is applied to the capacitative plates 18 and 19, since then the ends of the arms 6 and 7, adjacent those plates, will be repelled and will thus tend to move downwardly. If the potentials applied to the capacitative plates are then reversed, with the positive potential being applied to plates 18 and 19, and with a negative potential being applied to plates 15 and 16, the oscillating mass 5 will rotate about the axis coincident with the connecting beam 8. If the signals are applied to the capacitative plates 15, 16, 18, 19, at appropriate times, preferably under the control of a feedback loop, the oscillating mass 5 will oscillate with a see-saw motion at a regular frequency about the axis of the interconnecting beam 8. However, because the interconnecting beam 8 is formed integrally with the beam 2 that extends between the fixed pads 3 and 4, a torsional force is applied to that beam, and since that beam has a "soft" bending direction, which makes an acute axis with the plane of the substrate, the end result is an oscillation of the oscillation mass 5 about the vertical excitation axis which extends perpendicularly to the plane of the substrate. As a consequence, the beam 2 executes a bending motion as shown by the bending line 20 shown in FIGS. 1 and 2. The beam 2 thus bends in one direction to have an "S" configuration, and then bends in the opposite direction to have an inverted "S" configuration. It is preferred that the signals used to excite the oscillating mass 5 cause it to oscillate at a natural resonance frequency within the plane of the substrate.

The electronic arrangement is also associated with two further leads 21, 22, which extends to capacitative plates 23, 24 also mounted on a glass or semi-conductive substrate located above the arms 6, 7, substantially in alignment with the interconnecting beam 8.

On rotation of the body 1, about the sensitivity axis 10, as a consequence of the coriolis forces applied to the oscillating mass 5, the entire oscillating mass 5 will tend to rotate about the detection axis 12, which is coincident with the axis of the beam 2. Thus one arm, for example the arm 6, will move towards the capacitative plate 23, whereas the other arm, for example the arm 7, will tend to move away from the capacitative plate 24. The electronic arrangement is adapted to determine the change in capacitance between the capacitance plate 23 and the electrically conductive layer 9 on the body 1, and also the change in capacitance between the plate 24 and the conductive layer 9 on the body 1. By determining the change in capacitance, the degree of rotation about the detection axis 12 of the oscillating mass 5 can be determined, and consequently information concerning the initial rotation of the body 1, such as angular velocity, can be determined.

It is thus to be understood that FIG. 2 shows an arrangement according to the invention for angular velocity measurement showing the associated excitation and detection circuits diagrammatically in an embodiment of the type having capacitative excitation and detection. The capacitances 15, 16, 18, 19 excite the arrangement so that the mass oscillates mainly in the substrate plane and the capacitances 23, 24 are used to measure the amplitude of the mass oscillation out of the substrate plane, which is fed back to a excitation circuit within the electronic arrangement and to the analysis electronics which calculate the angular velocity. If the gyroscopic scale factor is sufficiently large, it is also feasible to use piezo-resistive detection instead of capacitative detection and in this way achieve a simpler and less expensive system.

If the angular velocity exceeds a threshold, or if the composite angular velocity from a plurality of orthogonally mounted sensors of the type described exceeds a threshold, a safety device in the motor vehicle, such as an air-bag, may be deployed.

FIG. 3 is a diagrammatic plan view and cross-section of a body 30 which has many features which are substantially the same as the corresponding features of the body 1 described above. These features are identified with the same reference numerals as used in FIGS. 1 and 2, and will thus not be re-described.

It is, however, to be noted that in the embodiment of FIG. 3, the pads 3, 4, at opposite ends of the beam 2, are of an enlarged size, whereas the portions 6, 7 formed at the opposed ends of the transverse connecting bar 8 to constitute the oscillating mass 5, are each substantially square as opposed to being rectangular, and thus form blocks 6, 7 rather than "arms".

As, in the embodiment of the FIG. 2, the beam 2 extending between the two pads 3, 4, has a cross-section of rectangular form, with the two long parallel sides of the rectangle being inclined at an acute angle to the plane of the substrate from which the body 30 is formed.

As can be seen from FIG. 3, the side faces of various elements of the described body are of an inclined configuration. This is as a consequence of the etching techniques utilised to fabricate the body from a silicon substrate. It is envisaged, however, that the body will be substantially symmetrical about a line super-imposed on the detection axis 12 which is aligned with the axis of the beam 2. Thus, if the body illustrated in FIG. 3 were rotated by 180° about the detection axis 12, the body would still present the same appearance as shown in FIG. 3.

At this stage it is to be noted that there is one substantial physical difference between the body 30 shown in FIG. 3, and the body 1 shown in FIGS. 1 and 2, in that the beam 2 is provided, at points between the inter-connecting bar 8 of the oscillating mass 5, and the pads 3 and 4, with laterally extending rectangular reinforcing elements 31, 32. The reinforcing elements are symmetrical and thus extend, by the same extent, on each side of the beam 2. The reinforcing elements are spaced half-way between the transverse connecting bar 8 and the adjacent pad 3 or 4. The reinforcing elements 31, 32 tend to move obliquely upwardly, and obliquely downwardly, when the beam 2 is executing its "S"-shape bending, as a consequence of the oscillation of the oscillating mass 5 within the plane of the substrate about the excitation axis, when the illustrated body 30 is utilised with an electronic arrangement of the type illustrated in and described with reference to FIG. 2. The reinforcement elements 31, 32 are designed to adjust the resonant frequency of the bar 2.

Thus FIG. 3 diagrammatically illustrates how the bar 2 can be built up by reinforcements 3 so that the same or a near resonant frequency is obtained for the excited S-bending mode and for the detected turning mode. By building up the modes in this way the reinforcement given by the mechanical Q-factor can be utilised to increase the gyro sensitivity.

Turning now to FIGS. 4 and 5, a sensor body 40 is illustrated, which is adapted to sense rotation about a predetermined axis 51. The illustrated body sensor 1 has been etched from a planar substrate formed of a more crystalline semi-conductive material such as silicon. It is to be appreciated that a plurality of bodies may be etched in a single substrate of silicon, and may thus comprise a plurality of sensors adapted to sense rotation about a plurality of axes.

The body 40, as shown in FIGS. 4 and 5, comprises an elongate beam 41, the opposed ends of which are supported by pads 42, 43 so that the opposed ends of the beam may be mounted in fixed predetermined positions, for example, on the chassis of a motor vehicle. The pads 42, 43 are illustrated as being relatively small pads, but it is to be appreciated that the pads may form an integral part of a much larger silicon substrate.

The beam 41 in the embodiment is configured so that it bends most easily in one predetermined direction—"soft" bending direction. In the described embodiment, the "soft" bending direction is not parallel with the substrate, and is not perpendicular to the substrate, but instead is inclined at an acute angle to the plane of the substrate. In the embodiment of the invention illustrated in FIGS. 4 and 5, this is achieved by forming the beam 2 to have a generally rectangular cross-section, with the shorter sides of the rectangle being constituted by the upper and lower surfaces of the substrate, and the longer parallel sides of the rectangle being inclined at an acute angle to the surfaces of the substrate. In the described embodiment the acute angle is approximately 55°. The "soft" bending direction of the beam is substantially perpendicular to the longer parallel sides of the rectangular cross-section.

The beam 41 is provided with two identical inertia masses, or oscillating masses, 44, 45. The masses are each symmetrical about the axis of the beam 41. The oscillating masses 44, 45 are evenly spaced along the beam 41 between the pad 42 and the pad 43, and consequently the body 1 is symmetrical.

The oscillating mass 44 comprises two substantially square blocks 46, 47, which are spaced apart on either side of the beam 41, the blocks 46, 47 being interconnected by an interconnecting bar 48. The mid part of the inter-connecting bar 48 is coincident with a part of the beam 41.

The upper surface of at least the blocks 46, 47, but preferably the whole of the illustrated body 40, is provided with an electrically conductive layer 49, such as a deposited layer of aluminium or other metal. The conductive layer may alternatively be formed using a doping or bonding technique.

The body 40, as shown in FIGS. 4 and 5, is intended to be mounted securely in position, for example on the chassis of a motor vehicle, by means of the pads 42, 43, to detect rotation about a sensitivity axis 51, the sensitivity axis being substantially parallel with the axes of the connecting bars 48 of the oscillating masses 44, 45, and being located midway between the two oscillating masses 44, 45.

As will be described, the blocks, such as the blocks 46, 47, of both of the oscillating masses, are excited by electrostatic forces applied in a direction perpendicular to the plane of the substrate. As a consequence of the applied forces, the blocks 46, 47 tend to rotate about the axis of its interconnecting bar 48. Thus the oscillating mass 44 tends to rock about the axis of its interconnecting bar 48 with a "see-saw" motion. The oscillating mass 45 also rocks about the axis of its connecting bar with a "see-saw" motion, in anti-phase with the mass 44. This applies a torsional rotation to the part of the beam 41 that is coincident with the central part of each interconnecting bar 48. Because the beam 41 has a "soft" bending direction which makes an acute angle with the plane of the substrate, the torsional rotation leads directly to an oscillating movement of the oscillating mass 44 and the oscillating mass 45 substantially within the plane of the substrate, about an oscillation axis which is perpendicular to the substrate at a point adjacent the junction between the beam 41 and each interconnecting bar 48.

The two masses 44 and 45 are excited so that the masses execute an oscillating movement substantially with the plane of the substrate in anti-phase. Thus the block 46 of the mass 44, and the adjacent block of the mass 45, tend to move away from each other simultaneously, and subsequently tend to move towards each other simultaneously. Consequently, the beam 41 executes a simple bending, as illustrated by the dotted line 50. Because the masses oscillate in anti-phase the total movement of the total system is zero on excitation of the bar because there is no movement of the centre of gravity.

Referring now to FIG. 5, it can be seen that the body 40, as described with reference to FIG. 4, is intended for use with an electronic arrangement 60. The electronic arrangement 60 is provided with a first lead 61 adapted to apply a potential to the conductive layer 49. The electronic arrangement 60 is provided with a further lead 62 adapted to supply a potential to capacitative plates 63, 64, located above parts of the blocks 46, 47 of the oscillating mass 44 located closest to the pad 43, and simultaneously to corresponding capacitative plate 65, 66 provided at the other end of the element 40.

Equally, the electronic arrangement 60 is provided with a further lead 67 adapted to provide a potential to capacitative plates 68, 69 located above the regions of the blocks 46, 47 located towards the centre of the body 40, and also to corresponding capacitative plates 70, 71 associated with the oscillating mass 45. As in the embodiment of FIGS. 1 and 2, the capacitative plates may be on a glass insulating substrate or on a semi-insulating substrate.

It is to be appreciated that if a specific potential, such as an earth potential, is applied to the lead 61, and if anti-phase signals are applied to the leads 62, 67, the oscillating mass 44 (and similarly the oscillating mass 45) may be caused to oscillate about the axis of the beam 48. A first potential, such as a negative potential, may be applied to the conductive layer 49. If then a negative potential is applied to the lead 62, and a positive potential is applied to the lead 67, a negative potential is present on the capacitative plates 63, 64, and thus there will be a repulsion between those plates, and the adjacent parts of the blocks 46, 47 of the oscillating mass 44. Simultaneously, a positive potential is applied to the capacitative plates 68, 69, meaning that there will be an attraction between the adjacent parts of the blocks 46, 47 and those plates. Consequently, the oscillating mass will tend to rotate, in an anti-clockwise direction, as shown in FIG. 5, about the axis of the connecting bar 48. It will be appreciated that simultaneously the oscillating mass 45 will tend to rotate in a clockwise direction about the connecting bar of that oscillating mass.

If the polarities applied to the leads 62 and 67 are reversed, the oscillating mass 44 will tend to rotate in a clockwise direction, whereas the oscillating mass 45 will tend to rotate in an anti-clockwise direction.

If the signals are applied to the oscillating masses 44 and 45 in the manner described, at an appropriate frequency, the masses 44,45 will tend to rock with a "see-saw" action. As a consequence of the fact that the "soft" bending direction of the beam is inclined at an angle to the plane of the substrate, the oscillating masses 44 and 45 will tend to execute an oscillation in the plane of the substrate, with each oscillation being about a substantially vertical axis coincident with the point of inter-section of the beam 41 and the interconnecting bar 48 of each oscillating mass 44, 45. As a consequence, the beam 41 will actually execute a simple bending motion, as illustrated by the dotted line 50 in FIG. 4.

The electronic arrangement of FIG. 5 is also associated with four further capacitative plates 72, 73, 74, 75, with each plate being associated with a respective one of the blocks, such as blocks 46, 47, of the oscillating masses 44, 45. If, when the masses are oscillating in the manner described, the entire body is rotated about the sensing axis 50, as a consequence of the coriolis forces applied to the oscillating masses 44, 45, the masses will tend to rotate about the detecting axis, which is an axis 80 which is coincident with the axis of the beam 41. This rotation may be detected by the capacitors 72, 73, 74, 75, since, one block of each oscillating mass 44 will approach the adjacent capacitative plate, whereas the other block of that oscillating element will move away from the adjacent capacitative plate, and the changes in capacitance can be measured and supplied to the electronic arrangement where appropriate detection circuitry will determine the parameters of the term applied to the body 40 about the sensing axis 50.

Thus it will be understood that FIG. 4 is a plan view of, and FIG. 5 is a perspective view of an embodiment of the invention suitable for angular velocity measurement, consisting of a beam 41, the soft bending direction of which is not at right angles to or parallel to the normal to the substrate plane and two masses 44, 45. The body is excited so that the bar oscillates in a single bending mode which causes the masses to oscillate in counter-phase mainly in the substrate plane parallel to the resultant sensitivity axis and around the excitation axis. The advantage of this over a bar with a centrally disposed mass is that appropriate configuration and location of the two masses enables the angular momentum for the total system to be made zero, which makes the detection insensitive to external angular vibration.

A balanced oscillation mode also has a positive effect on the Q-factor since no energy is radiated to the environment. When the masses, which are vibrating in counter-phase, are subjected to a rotation around the sensitivity axis, the Coriolis force results in a turning moment on the masses which will oscillate the latter around the detection axis coinciding with the longitudinal axis of the beam 41, and the masses will start to swing out of the plane in counter-phase. The cross-section of FIG. 4 shows the Coriolis force on an oscillating mass at right angles to the excited mass movement and sensitivity axis.

It is also advantageous in embodiments of the invention of this type to provide reinforcing segments on certain sections of the beam 41 (as shown in the embodiment of FIG. 3) in order better to match the resonant frequency of the excited bending mode to the detected turning mode.

For a bar oriented with the longitudinal direction in the z-axis direction in an xyz-co-ordinate system of arbitrary cross-section 80, the different moments of inertia $I_y$, $I_{xy}$ and $I_x$ can be calculated in accordance with the equations given in FIG. 6. For such a cross-section, a co-ordinate transform will always be effected so that the cross inertia product $I_{x'y'}=0$ and so that the moment of inertia around the x'-axis becomes $I_{x'}$=Imin and, for the y'-axis, $I_{y'}$=Imax. In this context the "soft" plane of the bar is defined as the plane erected from the x' and z-axis and the "soft" bending direction as the y' direction normal to the "soft" plane. To enable the arrangement to be excited with a force directed mainly along the normal to the substrate plane, it is necessary for the "soft" bending direction of the bar not to be at right angles to or parallel to the normal to the substrate plane, and it is preferable that $I_{y'}$=Imax to be greater than $I_{x'}$=Imin.

By using anisotropic wet etching, for example, of 100 oriented silicon substrate/films, an etching is obtained which has an angle of 54.7° to the substrate normal plane. Different types of anisotropic dry etching, i.e. "plasma" etching, can produce more or less vertical etchings on a silicon surface, and diffused electrochemical pn-etching crests can be used to produce an etching profile. By using the various etching methods individually and in combination it is possible to produce a number of different cross-sections which meet the demand that the soft bending direction of a bar should not be at right angles to or parallel to the normal to the substrate. FIG. 7 shows, by way of example six different bar cross-sections of this kind 81, 83, 87, 89, 91. The bar cross-section 81 can, for example, be produced by anisotropic wet etching, from opposite sides of the substrate, with technology known from Swedish patent SE9203648-2. This bar has a "soft" plane 82. The bar cross-section 83 can be produced, for example, etching solely from the top, using anisotropic wet etching to etch the left-hand edge and using anisotropic dry etching to etch the right-hand edge. This bar has a "soft" plane 84. The bars of cross-section 85, 87 can be produced, for example, by anisotropic dry etching of the left-hand edge and by means of electrochemical pn-etching crests for the right-hand edge possibly in combination with anisotropic dry etching as for bar cross-section 87 is concerned. These bars have "soft" planes 86, 88. The bar cross-section 89 is an example of a combination of anisotropic wet etching and anisotropic dry etching in which the straight edges are etched with dry etching and the sloping edges by wet etching. This bar has a "soft" plane 90. The bar cross-section 91 is an example of use of anisotropic dry etching in two stages in which an incision in the bar has been etched out. This bar has a "soft" plane 92.

FIG. 8 illustrates an arrangement incorporating a silicon body 1 of the type described above with reference to FIGS. 1 and 2, together with the associated electrodes.

As described above, the body 1 is formed in silicon, and constitutes not only the mechanical structure of the sensor, but effectively one-half of each of the capacitances that are provided to excite the body and to perform the detection function. The other half of each of the capacitances comprises a capacitative plate which is situated on an insulator, for example of glass or semi-insulating silicon, to minimise the stray capacitances to earth. As will be described signals are fed to the capacitative plates which are situated on the glass, whilst a fixed DC potential is applied to the silicon body 1.

The sensor is excited by a low frequency signal on the capacitative plates which provide the excitation function, that low frequency signal being at the required mechanical resonant frequency of the oscillation mode of the body 1. At the same time, the capacitative plates that perform the excitation and detection functions are fed with respective high frequency signals. The sensor, which oscillates at the excitation frequency, will then act as a modulator which modulates the high frequency measurement signal in proportion to the oscillation amplitude. The measurement signal for both the excited oscillation, with the plane of the body 1, and also the oscillation about the detection axis, detected as a result of rotation of the body, are mixed together in circuitry which may be embodied within the silicon substrate, and coupled-out to a sensitive pre-amplifier.

After the pre-amplifier the signals are divided up in an excitation and detection loop and are mixed with respective high-frequency signals and then are subjected to low-pass filtering and again divided up and mixed with the excitation signal having two phase positions 0 and 90° respectively. The 0 and 90° signals are fed back in the excitation loop via a regulator network to the voltage-controlled oscillator which generates the excitation signal.

After mixing with the excitation signal in the detection loop the 90° signal represents rotation and the 0° signal represents the mechanical imbalance signal. Any capacitative imbalance will also give a signal in phase with the required signal and this unwanted signal can be much greater than the useful signal. One method of controlling this is to feed back both the 0 and 90° signals via a balancing network and in this way to control the generation of a balancing signal to the mass to compensate for both the mechanical and electrical imbalance in the sensor structure. This balancing signal can be of the AC type with the same frequency as the excitation signal or consist of different DC voltages applied in accordance with an intelligent pattern.

The rapidity of feedback determines which type of sensor embodiment is to be used. An infinite time constant corresponds to a constant compensation and an embodiment with an open loop. A short time-constant corresponds to an embodiment with a closed loop, while a slow time constant gives a hybrid construction—a sensor with a high-pass characteristic in which the time constant gives the cut-off frequency.

Producing the arrangement in a semi-conductor substrate enables the excitation, detection and signal processing electronics to be integrated in the same substrate as the arrangement together with the necessary control and regulation electronics.

Setting the arrangement into oscillation requires active excitation, and there are number of techniques available:— capacitative, thermal, piezo-electric films, etc. Which method is selected depends, inter alia, on the form of construction, encapsulation and required accuracy of application. In the case of capacitative excitation, the structure is excited generally via an oscillatory electric field between suitably located plate capacitors. Excitation can be effected directly between two movable mechanical parts, or alternatively between one or more fixed parts and a movable part. Thermal excitation is obtained by heating the bar locally via a resistance or a radiation source, e.g. a pulsed laser, and in this way achieving a stress gradient in the bar, and if the thermal excitation is effected at a frequency near the natural frequency of the structure the bar can be made to self-oscillate at the natural frequency. By depositing one or more layers of piezoelectric films, e.g. ZnO, on the bar, with appropriate contacting, and by then applying an oscillatory electric field over the piezoelectric films, the bar can be set in oscillation.

Just as in the case of excitation, a number of principles are available for detection of the oscillation, capacitative, resonant stress sensors, piezoelectric, piezo-resistive and so on. Depending on the form of construction and the required accuracy, preference may be given to one or other. In an embodiment of the arrangement of the type with a closed loop, detection of the oscillation generated by the Coriolis force is advantageously capacitative, since feedback and any prestressing can then be effected by an electric field between the bar/mass/masses and the surrounding conductive plates. This gives access to capacitors whose capacitance varies with the arrangement position and a shift can be detected by means of a capacitance bridge, which in turn gives a signal to a servo system which changes the electric field in such a manner that the bar/mass/masses are returned to the zero position. Detection with resonant stress sensors can prove an interesting detection method if the arrangement is then to be encapsulated in a vacuum since this has a very high Q-factor and gives high resolution. Piezo-electric detection may be an interesting method if the excitation is also effected piezoelectrically so that this is advantageously accessible without extra processing stages. A simple method of achieving detection of the bar movement is by means of the piezo-resistive effect using a resistance formed by doping the silicon substrate. To obtain maximum sensitivity, it is advantageous to use a balanced bridge coupling comprising four resistances appropriately disposed. Furthermore, to obtain the maximum piezo-resistive effect, the resistances should be placed where the stress produced in the bar by the bending/turning requiring to be detected is at its greatest. For special applications it is also possible to utilise optical detection of the movement of the bar/mass/masses, for example by using the interference phenomenon or by using an arrangement in which the position of a reflected bar of light depends on the position of the bar/mass/masses.

What is claimed is:

1. A sensor adapted to respond to a rotation, said sensor comprising a body formed from a substantially planar substrate, said body incorporating a beam having a longitudinal axis, the beam having two opposed ends, each end being adapted to be fixed in position, the beam being provided with at least one inertia mass connected to the beam at a predetermined position, the body being associated with means for exciting a first oscillation of said at least one inertia mass substantially about an axis perpendicular to the plane of the substrate, there being means for detecting a second oscillation of said at least one inertial mass, substantially around an axis coincident with the longitudinal axis of the beam, which second oscillation is caused by the Coriolis force that arises when the body is subjected to rotation around an axis angularly displaced from perpendicular to said plane, but perpendicular to the said axis of the beam, the beam being configured so that the beam bends most easily in one predetermined direction, that direction making an acute angle with said plane, so that the direction is neither parallel with, nor perpendicular to said plane, so that the first oscillation may be initiated by an excitation force which is not parallel with said plane.

2. A sensor according to claim 1 wherein the beam is such that the first oscillation may be caused by an excitation force which is substantially perpendicular with said plane.

3. A sensor according to claim 1 wherein the predetermined direction in which the beam bends most easily is at approximately 55° to the plane of the substrate.

4. A sensor according to claim 1 wherein said at least one inertia mass comprises two elements, located respectively on either side of the beam, within the plan of the substrate, the two elements being interconnected by a connecting bar, the central portion of the connecting bar being unitary with a portion of the beam.

5. A sensor according to claim 1 wherein the means for exciting the first oscillation said at least one inertia mass comprise at least one capacitative plate located adjacent a selected portion of said at least one inertia mass, and means to apply selected potentials to the capacitative plate, said at least one inertia mass being provided with a conductive portion, the arrangement being such that the potentials applied to the capacitative plate causes part of said at least one inertia mass to tend to be deflected out of the plane of the substrate.

6. A sensor according to claim 5 wherein there is a plurality of said capacitative plates.

7. A sensor according to claim 5 wherein the capacitative plate is on a substrate of glass or semi-insulating silicon.

8. A sensor according to claim 5 wherein the means for applying potentials to said capacitative plate are adapted to supply signals which generate a "see-saw" motion of said at least one inertia mass about a connecting bar connecting said at least one inertia mass to said beam, the effect of the configuration of the beam being such that said seesaw motion generates the said first oscillation about the axis perpendicular to the plane of the substrate.

9. A sensor according to claim 1 wherein the means for detecting the second oscillation comprise a capacitative plate located adjacent a selected portion of said at least one inertia mass, and means to measure the capacitance between said capacitative plate and the said body to detect said second oscillation.

10. A sensor according to claim 9 wherein there is a plurality of said capacitative plates.

11. A sensor according to claim 1 wherein there is only a single inertia mass, that inertia mass being located substantially centrally of the beam, half-way between the means provided at the opposed ends of the beam for mounting the beam in position.

12. A sensor according to claim 11 wherein the single inertia mass is symmetrical about the axis of the beam.

13. A sensor according to claim 1 wherein there are two inertia masses, the inertia masses being symmetrically disposed on the beam, each inertia mass being located at a position between the centre part of the beam and a respective end of the beam.

14. A sensor according to claim 13 wherein the two inertia masses are identical and symmetrical about the axis of the beam.

15. A sensor according to claim 13 wherein each inertia mass is provided with means for exciting an oscillation of the mass around an axis perpendicular to the plane of the substrate, the arrangement being such that the masses oscillate in anti-phase.

16. A sensor according to claim 1 wherein the body is formed from a mono-crystalline substrate.

17. A sensor according to claim 1 wherein the body is formed from silicon.

18. A sensor according to claim 1 adapted to provide an output signal representative of angular velocity.

19. A sensor according to claim 1 mounted on a motor vehicle to control deployment of a safety device.

20. A sensor adapted to respond to a rotation, said sensor comprising a body formed from a substantially planar substrate, said body incorporating a beam having a longitudinal axis, the beam having two opposed ends, each end being adapted to be fixed in position, the beam being provided with inertia mass means connected to the beam, the body being associated with means for exciting a first oscillation of the inertia mass means, that first oscillation being an oscillation about an oscillation axis, there being means for detecting a second oscillation of the inertia mass means, substantially around an axis perpendicular to said oscillation axis, which second oscillation is caused by the Coriolis force which arises when the body is subjected to a rotation about an axis angularly displaced from perpendicular to the plane of said planar substrate, but perpendicular to the said axis of the beam, wherein the inertia mass means comprises at least two discrete inertia masses, located at different positions spaced from each other along the length of the beam, the said two masses being excited to oscillate in anti-phase.

21. A sensor according to claim 20 wherein the oscillation axis is within the plane of the substrate and the perpendicular axis is coincident with the longitudinal axis of the beam.

22. A sensor according to claim 20 wherein there are two inertia masses, the two inertia masses are symmetrically disposed on the beam, each inertia mass being located at a position between the centre part of the beam and a respective end of the beam.

23. A sensor according to claim 22 wherein the two inertia masses are identical and symmetrical about the axis of the beam.

24. A sensor according to claim 20 wherein said inertia mass means comprises two elements, located respectively on either side of the beam, within the plane of the substrate, the two elements being interconnected by a connecting bar, the central portion of the connecting bar being unitary with a portion of the beam.

25. A sensor according to claim 20 wherein the first oscillation may be caused by an excitation force which is substantially perpendicular with said plane.

26. A sensor according to claim 20 wherein the means for exciting the first oscillation of the inertia mass means comprises a plurality of capacitative plates, at least one capacitative plate being located adjacent a selected portion of each inertia mass of said inertia mass means, and means to apply selected potentials to the capacitative plates, the inertia masses each being provided with a conductive portion, there being means to apply a predetermined potential to the conductive portion provided on each inertia mass, the arrangement being such that the potentials applied to the capacitative plates cause part of each inertia mass to tend to be deflected out of the plane of the substrate.

27. A sensor according to claim 26 wherein each capacitative plate is on a substrate of glass or semi-insulating silicon.

28. A sensor according to claim 26 wherein the means for applying potentials to said capacitative plates are adapted to supply signals which generate a "see-saw" motion of each inertia mass about a connecting bar connecting such inertia mass to said beam, the beam being configured so that the beam bends most easily in one predetermined direction, that direction making an acute angle with the plane of the substrate, so that the direction is neither parallel with, nor perpendicular to the plane, so that this "see-saw" motion generates an oscillation of each inertia mass about an axis perpendicular to the plane of the substrate.

29. A sensor according to claim 26 wherein the means for detecting the second oscillation comprise further capacitative plates, at least one further capacitative plate being located adjacent a selected portion of each inertia mass, there being means to measure a capacitance between each of said further capacitative plates, and the said body to detect said second oscillation.

30. A sensor according to claim 20 wherein the body is formed from a mono-crystalline substrate.

31. A sensor according to claim 20 wherein the body is formed from silicon.

32. A sensor according to claim 28 wherein the sensor is adapted to provide an output signal representative of angular velocity.

33. A sensor according to claim 20 mounted on a motor vehicle to control deployment of a safety device.

\* \* \* \* \*